(12) United States Patent
Bright

(10) Patent No.: US 8,204,158 B2
(45) Date of Patent: Jun. 19, 2012

(54) METHOD AND APPARATUS TO REDUCE UNDESIRED AMPLITUDE MODULATION

(75) Inventor: Randall Glenn Bright, Pittsboro, NC (US)

(73) Assignee: Telefonaktiebolaget LM Ericsson (publ), Stockholm (CH)

( * ) Notice: Subject to any disclaimer, the term of this patent is extended or adjusted under 35 U.S.C. 154(b) by 2485 days.

(21) Appl. No.: 10/844,156

(22) Filed: May 12, 2004

(65) Prior Publication Data

US 2005/0254597 A1     Nov. 17, 2005

(51) Int. Cl.
*H04L 27/06*    (2006.01)
(52) U.S. Cl. ........ 375/340; 375/147; 375/271; 375/320; 375/322
(58) Field of Classification Search .................. 375/300, 375/295; 327/291; 332/106; 341/20, 173
See application file for complete search history.

(56) References Cited

U.S. PATENT DOCUMENTS

| | | | |
|---|---|---|---|
| 5,451,852 A | | 9/1995 | Gusakov |
| 6,054,895 A | * | 4/2000 | Danielsons et al. .......... 330/149 |
| 6,144,862 A | | 11/2000 | Oliver et al. |
| 6,373,901 B1 | * | 4/2002 | O'Dea et al. .................. 375/296 |
| 7,158,494 B2 | * | 1/2007 | Sander et al. ................. 370/329 |
| 2002/0176514 A1 | * | 11/2002 | Schell ........................... 375/298 |
| 2003/0060174 A1 | * | 3/2003 | Nguyen et al. ................ 455/110 |
| 2004/0219891 A1 | * | 11/2004 | Hadjichristos ................ 455/102 |
| 2005/0032483 A1 | * | 2/2005 | Klomsdorf et al. ........... 455/110 |

FOREIGN PATENT DOCUMENTS

EP     1198099 A2     4/2002

* cited by examiner

*Primary Examiner* — Dhaval Patel
(74) *Attorney, Agent, or Firm* — Coats & Bennett, PLLC

(57) ABSTRACT

A transmit circuit reduces undesired amplitude modulation (AM) in transmit signal pulses by substituting predetermined amplitude information for actual pulse amplitude information during portions of the pulse corresponding to nominally constant amplitudes. For example, GMSK and certain other modulation formats use a desired transmit pulse shape that includes a nominally flat middle portion. An exemplary AM reduction circuit detects generated pulse values corresponding to the nominally constant-amplitude portions of the transmit pulse and substitutes predetermined, preferably constant, amplitude values in their place. As such, the circuit may include a comparator used to detect the pulse values corresponding to variable amplitude portions of the pulse, which it passes through, and to detect those amplitude values corresponding to constant-amplitude portions of the pulse, which it replaces with substituted values. Such operation may include amplitude value filtering, and such operations may be modal, e.g., performed in dependence on modulation mode, etc.

36 Claims, 4 Drawing Sheets

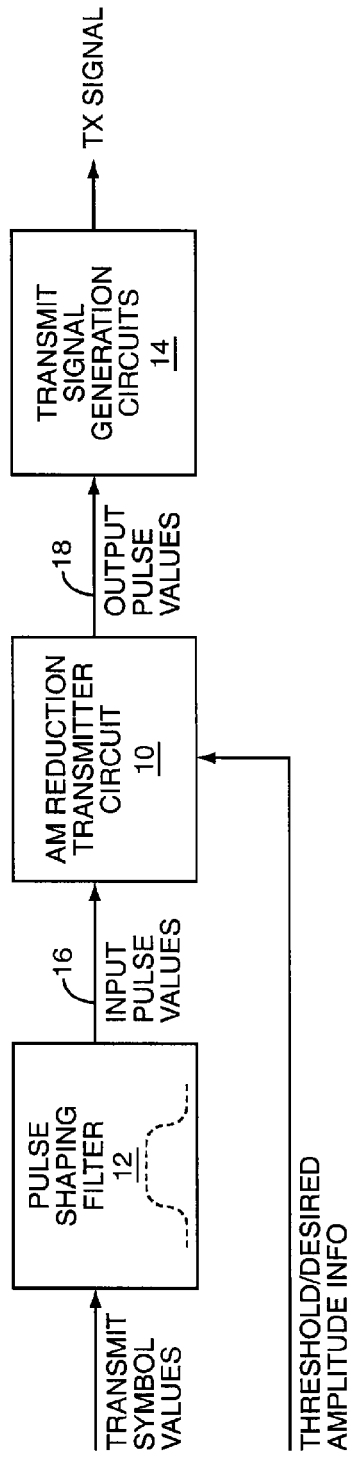
FIG. 1
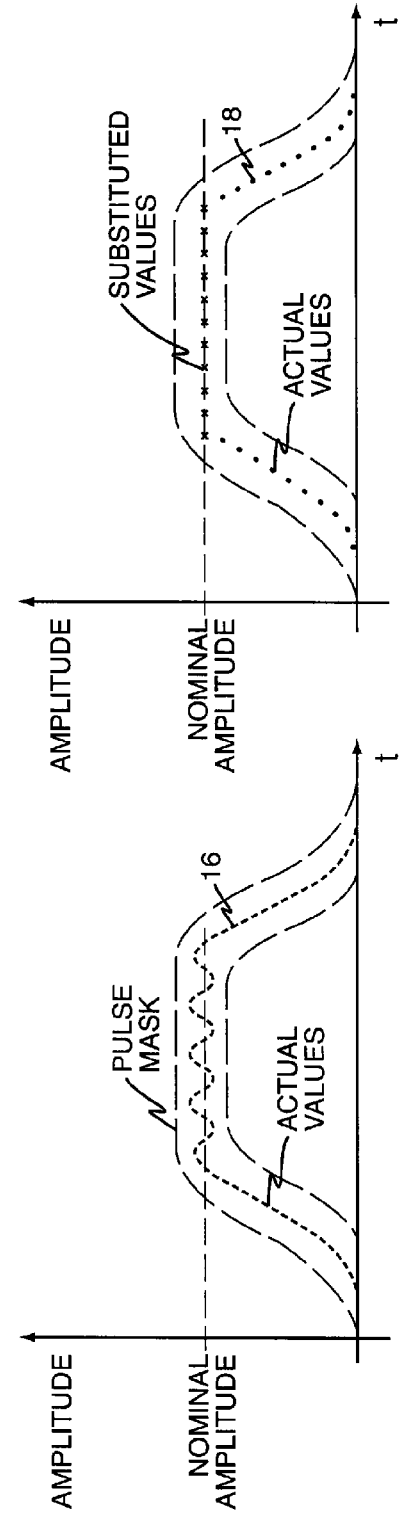
FIG. 2A
FIG. 2B

METHOD AND APPARATUS TO REDUCE UNDESIRED AMPLITUDE MODULATION

BACKGROUND OF THE INVENTION

The present invention generally relates to communication signal processing, and in particular relates to reducing undesired amplitude modulation in generated signal pulses.

Communication signal transmitters, such as the transmitters in cellular radiotelephones or other type of mobile communication device, generate transmit signal information in accordance with one or more defined communication standards or protocols. For example, the ubiquitous Global System for Mobile communications (GSM) standard defines a Gaussian Minimum Shift Keying (GMSK) transmit signal modulation format. GMSK is a form of non-linear continuous phase MSK modulation wherein a Gaussian filter is used to restrict the signal bandwidth.

Although the modulation format is inherently nonlinear, GMSK signals can be approximated as a superposition of amplitude modulated pulses. Thus, "linearized" GMSK signals may be generated using Quadrature Amplitude Modulation (QAM) or, equivalently, Offset Quadrature Phase Shift Keying (OQPSK), based on an in-phase (I) and quadrature (Q) signal pair. One advantage of generating linearized GMSK signals lies with the resultant efficiencies gained by reusing linear modulation signal processing elements.

For example, the Enhanced Data rates through GSM Evolution (EDGE) standard provides a mechanism for increasing data rates in GSM-based networks via the adoption of an 8PSK modulation format. Thus, a GSM/EDGE terminal is required to generate both GMSK and 8PSK signals depending on its mode of operation. Since 8PSK modulation is inherently linear, such terminals must include linear signal processing elements and, thus, adopting a linearized GMSK signal format allows reuse of at some of these processing elements.

However, the adoption of linearized GMSK signal generation is not without its drawbacks. For example, a certain amount of "ringing" is a common side effect of passing the I/Q components of linearized GMSK through the required pulse-shaping filter, i.e., the pulse mask that limits the spectral content of linearized GMSK pulses. That is, the nominally constant-amplitude portions of the generated linearized GMSK pulses in fact have a certain amount of undesired amplitude modulation that represent pulse shaping filter artifacts. These artifacts may or may not be harmful, depending on the limitations of the particular transmitter architecture, and on their magnitude.

More generally, those skilled in the art will appreciate that transmit signal pulse generation, GMSK or otherwise, often yields imperfectly generated pulses that are subject to overshoot, undershoot, ringing, and other pulse generation artifacts. These artifacts may cause any number of problems with respect to transmit signal generation.

SUMMARY OF THE INVENTION

The present invention comprises a method and apparatus to reduce undesired amplitude modulation in generated transmit signal pulses. While the invention may have particular benefits in the context of compensating linearized GMSK pulses, it is not limited to such applications. Indeed, the present invention broadly comprises a method of reducing undesired amplitude modulation in transmit signal pulses based on generating a transmit pulse according to a desired pulse shape, e.g., amplitude profile, and smoothing a section of the transmit pulse corresponding to a constant-amplitude portion of that shape. Exemplary smoothing comprises substituting predetermined amplitude values, e.g., a constant (flat) value, for actual amplitude values of the generated pulse within the portion or portions of the pulse that are nominally flat.

With the above in mind then, one embodiment of the present invention comprises a method of reducing undesired amplitude modulation in transmit signal pulses based on passing a data signal through a pulse shaping filter to obtain filtered pulse values that correspond to a desired transmit pulse shape, and obtaining modified pulse values having a reduction in undesired amplitude modulation for transmit signal generation. An exemplary method of obtaining the modified pulses is based on identifying the pulse values that correspond to a constant-amplitude portion of the desired transmit pulse shape, and substituting predetermined amplitude information for actual amplitude information in the identified pulse values.

Complementing the above method, an exemplary transmit circuit comprises a processing circuit configured to receive filtered pulse values from a pulse shaping filter configured to output the pulse values according to a desired transmit pulse shape. The exemplary processing circuit is further configured to obtain modified pulse values having a reduction in undesired amplitude modulation for transmit signal generation by identifying the pulse values that correspond to a constant-amplitude portion of the desired transmit pulse shape, and substituting predetermined amplitude information for actual amplitude information in the identified pulse values.

Thus, an exemplary mobile station, such as a cellular radiotelephone, or other type of mobile communication device, comprises a transceiver configured to transmit communication signals to the network and receive communication signals from the network. In accordance with the present invention, the exemplary transceiver includes a transmit circuit configured to reduce undesired amplitude modulation in transmitted signal pulses based on selectively substituting predetermined amplitude information for actual amplitude information in pulse values used to generate the transmitted signal pulses.

The transmit signal pulses of interest may comprise linearized GMSK pulses, in which case, predetermined amplitude information can be substituted for the actual filter-generated pulse amplitude values that correspond to the nominally constant-amplitude "middle" portion of GMSK pulses. An exemplary transmit circuit can be configured to provide GMSK pulse values for transmit signal generation based on passing actual generated pulse amplitude values along for signal generation for the beginning and ending ramp portions of each pulse, but substituting a predetermined (constant) amplitude value for the middle portion of such pulses.

More generally, however, the present invention comprises a method of reducing undesired amplitude variations in transmit signal pulses based on passing a data signal through a pulse shaping filter to obtain input pulse values that correspond to a desired transmit pulse shape, and generating output pulse values for transmit signal generation based on selectively substituting predetermined amplitude information for actual amplitude information in one or more of the input pulse values.

BRIEF DESCRIPTION OF THE DRAWINGS

FIG. 1 is a diagram of an exemplary amplitude modulation (AM) reduction circuit configured in accordance with one or more embodiments of the present invention.

FIGS. 2A and 2B are diagrams of generated pulse values before and after operation of exemplary AM reduction.

DETAILED DESCRIPTION OF THE INVENTION

Figure 3:
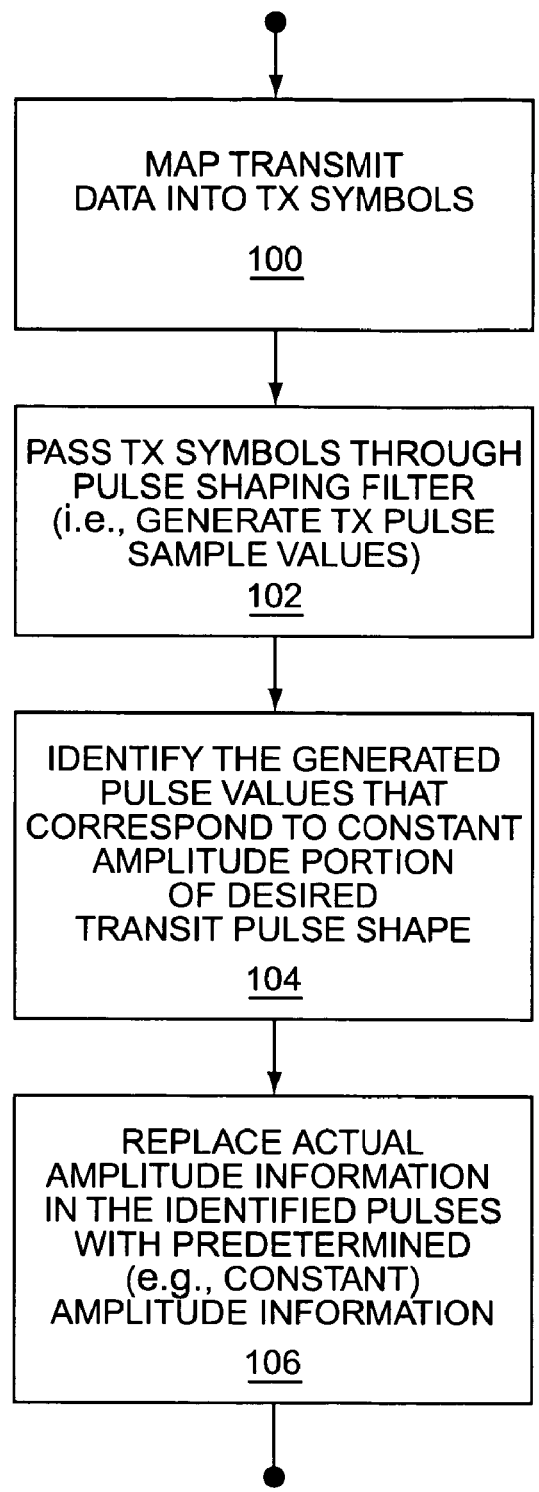
FIG. 3 is a diagram of exemplary processing logic to implement AM reduction in generated transmit signal pulses.

FIG. 1 illustrates an exemplary AM reduction circuit 10 that is configured in accordance with one or more exemplary embodiments of the present invention. Circuit 10 is associated with a pulse-shaping filter 12 and various transmit signal generation circuits 14. In operation, circuit 10 receives input pulse values 16 from pulse shaping filter 12 representing a set of values generated according to a desired transmit pulse shape. As will be explained later herein, passing transmit symbol values through pulse shaping filter 12 may result in undesirable amplitude modulation artifacts, e.g., unwanted amplitude modulation.

In exemplary operation, circuit 10 generates output pulse values 18 by eliminating or at least reducing the unwanted amplitude modulation in the input pulse values 16. The output pulse values 18 are then used in subsequent transmit signal generation by the transmit signal generation circuits 14. In reducing undesired amplitude modulations in transmit signal pulses, circuit 10 may receive amplitude threshold and/or desired amplitude information, which it may use to establish a threshold or baseline for flattening a nominally constant portion of the transmit pulse, for example.

Exemplary operation of circuit 10 is depicted by FIGS. 2A and 2B. In particular, FIG. 2A illustrates a desired transmit pulse shape (mask) that is imposed by pulse shaping filter 12, and illustrates that pulse values 16 may include undesirable amplitude modulation within a portion of the desired pulse shape that is intended to be a constant amplitude. As those skilled in the art will appreciate, such artifacts represent ringing or other digital filtering artifacts.

Notably, pulse shaping filter 12 itself may be tailored to minimize undesired amplitude modulations in the pulse values 16, but that may result in overly complex filter structure and/or may compromise its performance in other applications, such as where it is used in different transmit modes to shape both linearized GMSK pulses and 8PSK pulses. In any case, in at least one mode of operation, circuit 10 receives input pulse values 16 that correspond imperfectly to a desired transmit pulse shape. In particular, circuit 10 receives a sequence of preferably digital values representing a transmit signal pulse that include amplitude modulations occurring within a nominally constant-amplitude portion of the desired transmit pulse shape.

As shown in FIG. 2B, circuit 10 reduces these undesired amplitude modulations in the input pulse values 16 by generating output pulse values 18 that are used in actual transmit signal generation based on selectively substituting predetermined amplitude information for the actual amplitude information in selected ones of the input pulse values 16. In this specific embodiment, circuit 10 detects or otherwise identifies the particular input pulse values 16 that correspond to a nominally constant amplitude portion of the desired transmit pulse shape, and replaces actual amplitude information in those identified pulse values 16 with substituted values representing predetermined amplitude information.

Thus, the output pulse values 18 provided by circuit 10 for use in actual transmit signal generation represent a selected combination of the originally generated pulse values 16 as provided by pulse shaping filter 12 and substituted pulse values as determined by or provided to circuit 10. In simple terms, circuit 10 thus reduces undesired amplitude modulation by recognizing the input pulse values that correspond to nominally constant amplitude portions of the desired transmit pulse shape and cleanly replacing them with appropriate predetermined pulse values that may, for example, correspond to a desired constant amplitude value.

FIG. 3 illustrates exemplary processing logic that may be implemented by circuit 10 for carrying out the above described amplitude information replacement. In this regard, it should be noted that circuit 10 may comprise hardware, software, or any combination thereof. As such, circuit 10 may comprise all or a portion of a programmable microprocessor circuit, a Field Programmable Gate Array (FPGA), an Application Specific Integrated Circuit (ASIC), or other type of digital processing circuit. In an exemplary embodiment, amplitude modulation reduction is performed in the digital domain based on operating upon a series of digital sample values representing the generated transmit pulse as output by (digital) pulse shaping filter 12, wherein digitally represented amplitude values of the generated pulses are selectively replaced with predetermined digital amplitude information.

In any case, exemplary processing begins with mapping transmit data into corresponding transmit symbols. Those skilled in the art will appreciate that this process broadly represents the mapping of information bits to be transmitted into corresponding modulation values (Step 100). The transmit symbols are passed through pulse shaping filter 12 to generate transmit pulse sample values in accordance with the desired transmit pulse shape (Step 102).

Circuit 10 identifies the generated pulse values that correspond to a constant amplitude portion of the desired transmit pulse shape (Step 104). The actual amplitude information as generated via pulse shaping filter 12 in each of the identified input pulse values is replaced with predetermined (e.g., constant) pulse amplitude information (Step 106). Thus, actual transmit signal generation is performed based on a mix of actual amplitude information from the generated transmit pulse and substituted preferably constant-valued amplitude information for at least a portion of the generated pulse.

Figure 4:
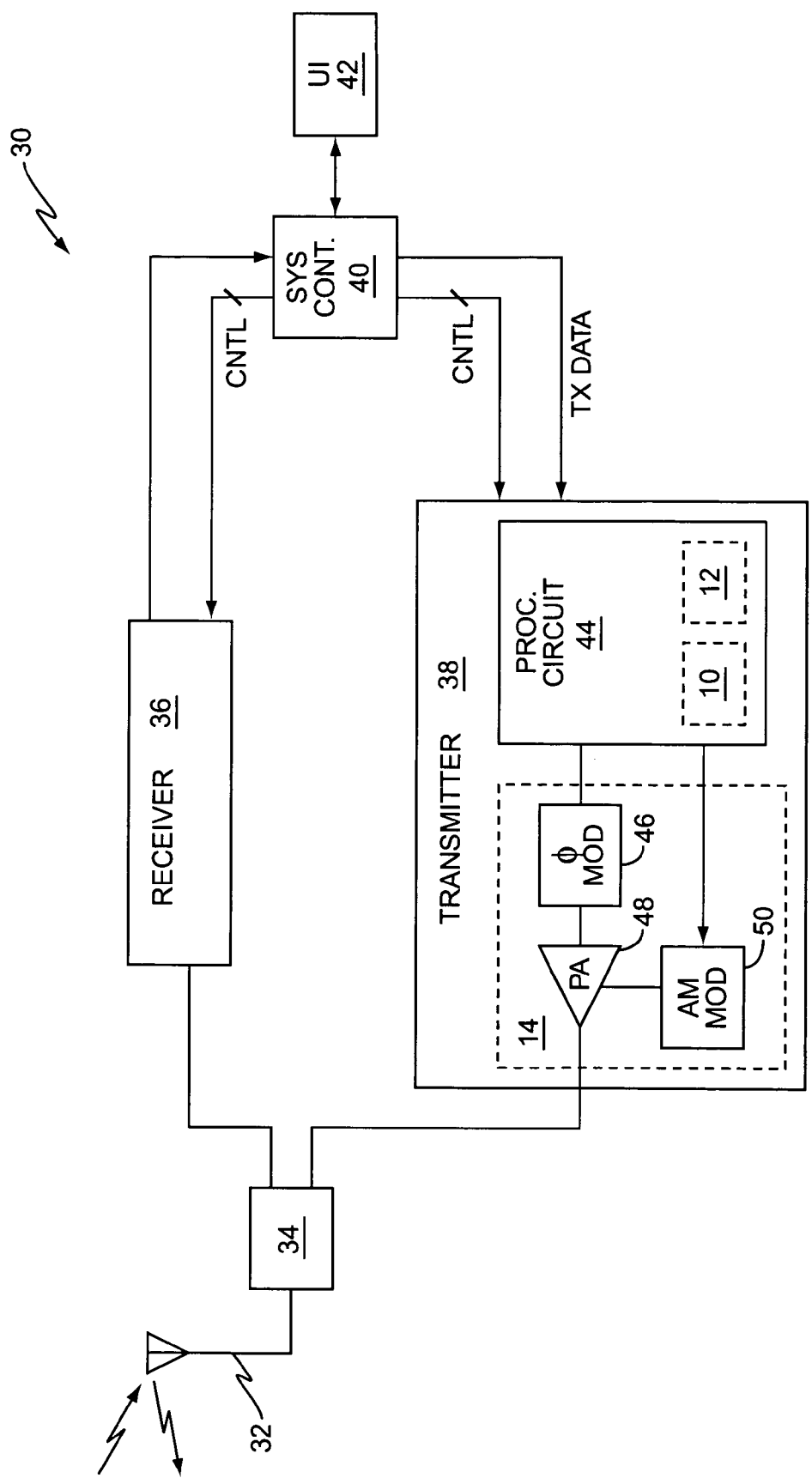
FIG. 4 is a diagram of an exemplary mobile terminal that includes an AM reduction circuit in accordance with the present invention.

Although the present invention has broad applicability, FIG. 4 illustrates its implementation in the context of a mobile communication device 30, which may be, but is not limited to, cellular radiotelephones, portable digital assistants (PDAs), palmtop/laptop computers, pagers, and other types of portable wireless electronic devices. Exemplary mobile terminal 30 comprises an antenna 32, a switch/duplexer 34, a receiver 36, a transmitter 38, a system controller or processor 40, and a user interface 42, which may comprise a display, a keyboard, a speaker, and a microphone.

The exemplary transmitter 38 comprises a processor circuit 44 that includes exemplary implementations of the aforementioned AM reduction circuit 10 and pulse shaping filter 12. Here, the transmit signal generation circuits 14 are configured for polar modulation wherein the information to be transmitted is separated into corresponding phase and amplitude information signals. As such, transmit signal generation circuits 14 comprise a phase modulator 46, a power amplifier (PA) 48, and an amplitude modulator 50.

In this configuration, processing circuit 44 provides a phase information signal to phase modulator 46, which in turn provides a constant envelope phase-modulated input signal to PA 48. Processing circuit 44 further provides an amplitude modulation information signal to amplitude modulator 50, which imparts amplitude modulations in the radio frequency (RF) output signal of PA 48 that are synchronized with the phase modulation information input to PA 48 by phase modulator 46. In exemplary embodiments, the amplitude modulator 50 modulates the input supply voltage and/or input supply current to PA 48 to impart the desired amplitude modulation to the PA's RF output signal. The general operation of polar modulation, also referred to as "envelope elimination and restoration" (EER) transmit signal generation is well known to those skilled in the art and is not further described herein.

In operation, transmitter circuit 38 generates transmit signal pulses based on receiving transmit data from system controller 40, for example. Processing circuit 44 also may originate certain data for transmission. Regardless, in at least one mode of operation, the transmit data is used to form transmit signal pulses that are passed through pulse shaping filter 12 and which, as a result, may include undesired amplitude modulation that is removed or reduced by circuit 10. As alluded to earlier herein, such circumstances may arise where mobile terminal 30 is configured for GSM/EDGE operation, such that pulse shaping filter 12 is configured in terms of bandwidth, etc., to filter both linearized GMSK pulses as well as 8PSK pulses, in which case the linearized GMSK pulses may include ringing or other AM artifacts during portions of the generated pulses that nominally are constant-amplitude.

Figure 5:
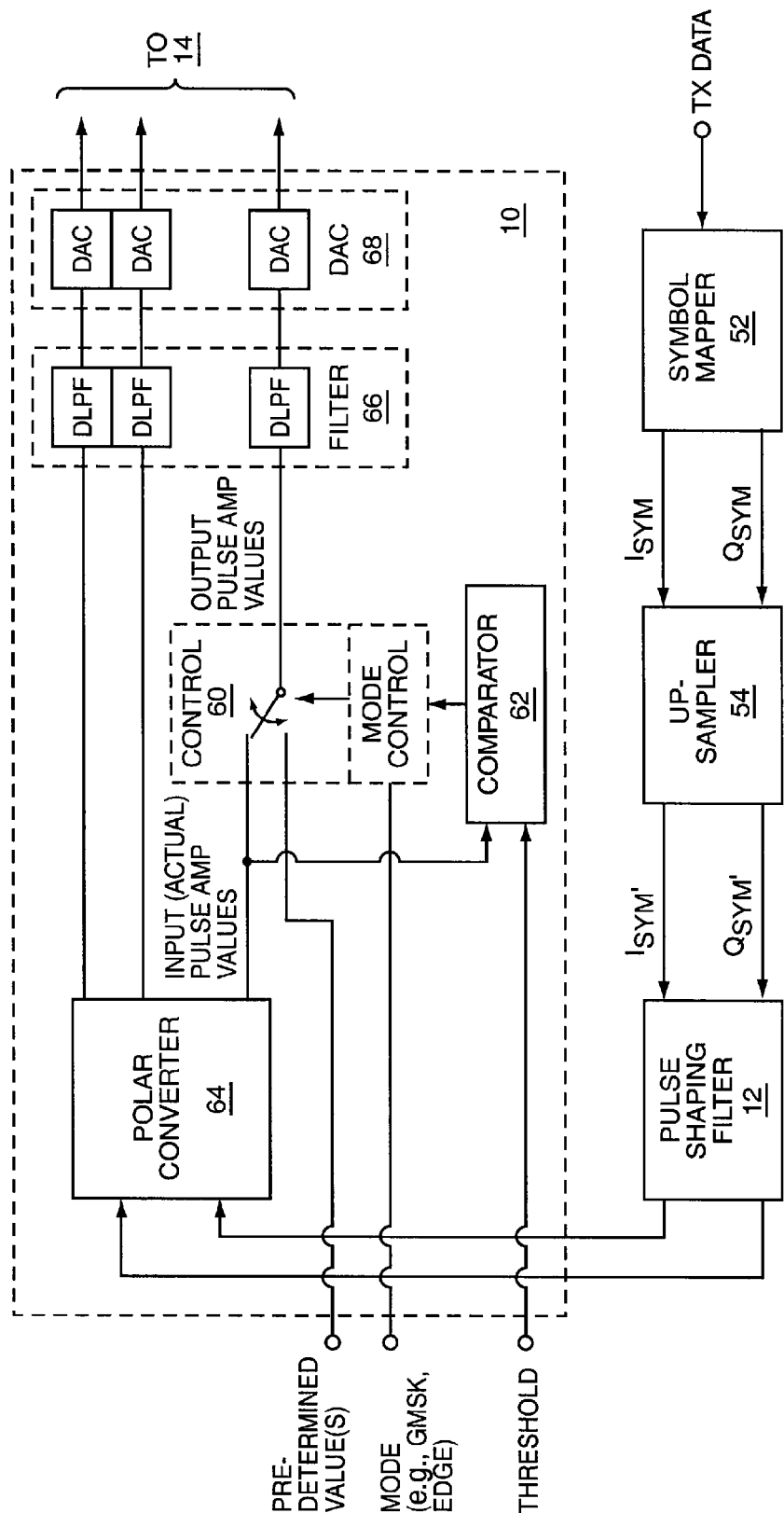
FIG. 5 is a diagram of an exemplary AM reduction circuit that may be used in the transmitter circuitry of the mobile terminal of FIG. 4.

FIG. 5 illustrates an exemplary embodiment of processor circuit 44 in a polar modulation configuration. Transmit data is passed through a symbol mapper 52 that creates in-phase and quadrature modulation symbol values ($I_{SYM}$ and $Q_{SYM}$) that are passed through up-sampler 54 to produce up-sampled in-phase and quadrature symbol values ($I_{SYM'}$ and $Q_{SYM'}$). (Here, up-sampling aids subsequent filtering operations.)

In turn, these up-sampled values are passed through pulse shaping filter 12 to produce generated pulse values corresponding to a desired transmit signal pulse shape. These generated pulse values are input to circuit 10, which here comprises a control circuit 60, and a comparator 62. Circuit 10 further includes, or is associated with, a polar converter 64, a digital filter 66, and Digital-to-Analog Converters (DACs) 68.

Polar converter 64 separates the incoming pulse values into corresponding phase and amplitude values, which may be normalized phase and amplitude values. Digital filter 66 receives the separated phase and amplitude values, filters them and passes them along for subsequent transmit signal generation. Generally, the phase values operated on by digital filter 66 are the actual phase values as output by pulse shaping filter 12, whereas the amplitude values operated on by digital filter 66 either comprise actual phase values from pulse shaping filter 12 as passed through by circuit 10, or predetermined amplitude values as substituted by circuit 10.

For example, assume that mobile terminal 30 is configured for at least two modes of communication, each having a different modulation format. By way of non-limiting example, mobile terminal 30 may be configured to operate in a first mode wherein it uses GMSK modulation, and in a second mode wherein it uses 8PSK modulation. (This type of modal operation would be found in a GSM/EDGE terminal, but those skilled in the art will appreciate that the present invention is not limited to such examples.) For operation in GMSK mode, terminal 30 uses processor circuit 44 in its transmitter 38 to generate linearized GMSK pulses via pulse shaping filter 12.

The pulse values generated by pulse shaping filter 12 are "monitored" by comparator 62 such that control circuit 10 can identify which generated pulse values correspond to the nominally-constant amplitude portion of the desired transmit pulse shape. In the context of linearized GMSK, for example, one may refer to FIGS. 2A and 2B to see that a nominal transmit pulse shape includes a rising amplitude beginning portion, a nominally constant-amplitude middle portion, and a falling amplitude ending portion.

Thus, comparator 62 may be configured to receive (or store) amplitude threshold information, which can be set at a level corresponding to a desired amplitude value for the middle portion of the desired transmit pulse shape. With that configuration, then, the separated (actual) amplitude values provided by polar converter 64 are input to comparator 62 for comparison to the defined amplitude threshold. The actual amplitude values below the threshold, i.e., those amplitude values corresponding to the rising and falling portions of the pulse, are passed through control circuit 60 as output amplitude values to be used in transmit signal generation (after filtering via digital filter 66). However, the actual amplitude values detected by comparator 62 as being above the desired amplitude threshold are blocked by control circuit 60, which outputs substituted predetermined amplitude values in their place for use in transmit signal generation (after filtering via digital filter 66).

Note that comparator 62 can be configured with a desired amount of hysteresis, so that it more reliably detects the rising edge-to-middle and middle-to-falling edge pulse transitions and does not respond to ringing within the actual amplitude values of the middle pulse portion. Alternatively, the defined amplitude threshold can be set low enough such that even the lowest-valued actual amplitude values output by pulse shaping filter 12 over the middle pulse portion are above the comparator threshold. Of course, those skilled in the art will appreciate that other configurations are possible and that the aim is to achieve reliable detection of those amplitude values that should be passed through and those amplitude values that should be replaced by substituted information. Further, those skilled in the art will appreciate that such detection operation will be modified as needed for other transmit pulse shapes.

Of further note, it will be understood that control circuit 60 and comparator 62 preferably operate in the digital domain. By way of non-limiting example, pulse amplitude information may be generated using twelve-bit digital values for a signed range of −2048 to +2047. Assuming that a value of 1500 represents a nominal amplitude for the constant amplitude portion of the linearized GMSK pulses, comparator 62 may be configured to detect when the actual amplitude values from polar converter 64 are below this value, and to signal control circuit 60 in response thereto. In turn, control circuit 60 may substitute a constant value of 1500 (or some other value as desired) in place of any actual amplitude values detected as above that threshold. Of course, those skilled in the art will recognize that such numeric ranges and operational details are a matter of implementation to be varied as needed or desired for a particular design.

Additionally, it may be seen from FIG. 5 that control circuit 60 may receive a mode control signal or other type of indicator that is used to control its operation. For example, control circuit 60 can be configured such that it performs its selective substitution of amplitude information in one mode but not in another mode (i.e., for GMSK modulation mode but not for non-GMSK modulation mode). Similarly, digital filter 66 can be configured for modal operation such that low-pass filtering is applied to the outgoing amplitude values in one mode but not in another mode. That is, filter 66 may be configured to filter the amplitude values in modes where control circuit 60 performs its selective amplitude substitution but not to filter the amplitude values where control circuit 60 simply passes through the actual amplitude values.

Filtering of the outgoing amplitude values, i.e., the amplitude values to be used in transmit signal generation by transmit signal generation circuits 14, is particularly beneficial where the amplitude substitution operations of control circuit 60 are active. That is, substituting predetermined amplitude values in place of a portion of the generated (actual) amplitude values for a given transmit signal pulse introduces a functional discontinuity in the pulse amplitude information with attendant increases in higher frequency spectral content. Thus, amplitude value filtering is desirable. The exemplary digital filter 66 further includes low-pass filters to filter the phase values in advance of transmit signal generation for further spectral control, and such filtering may or may not be modal.

In general, then, comparator 62 may be configured with one or more defined amplitude thresholds, which may be digital magnitude values, that it uses to identify which generated amplitude values correspond to nominally constant-amplitude portions of a desired transmit signal pulse shape. Comparator 62 signals control circuit 60 responsive to such identification, such that control circuit 60 performs selective substitution of predetermined amplitude information. That is, control circuit 60 passes through the actual amplitude information from polar converter 64 (or from pulse shaping filter 12 in non-polar modulation configurations) for pulse values corresponding to non-constant amplitude portions of a transmit pulse, and substitutes predetermined, preferably flat, amplitude information for pulse values corresponding to constant-amplitude portions of the transmit pulse.

The exemplary AM reduction circuit 10 may be configured to operate modally, wherein it performs its selective substitution of amplitude operation in one mode but not in another mode. Further, such operations preferably are carried out in the digital domain, but it should be understood that all or a portion of such operations can be carried out in the analog domain, e.g., control circuit 60, comparator 62, and selected other circuit elements may be analog circuits. In general, then, the foregoing discussion does not limit the present invention. Indeed, the present invention is limited only by the following claims and their reasonable equivalents.

What is claimed is:

1. A method of reducing undesired amplitude modulation in transmit signal pulses, the method comprising:
    passing a data signal through a pulse shaping filter to obtain filtered pulse values that correspond to a desired transmit pulse shape; and
    obtaining modified pulse values having a reduction in undesired amplitude modulation for transmit signal generation based on:
        identifying the pulse values that correspond to a constant-amplitude portion of the desired transmit pulse shape; and
        substituting predetermined amplitude information for actual amplitude information in the identified pulse values.

2. The method of claim 1, wherein passing a data signal through a pulse shaping filter to obtain filtered pulse values comprises passing transmit symbol values through a digital pulse shaping filter.

3. The method of claim 2, wherein passing transmit symbol values through a digital pulse shaping filter comprises passing linearized Gaussian Minimum Shift Keying (GMSK) symbol values through the digital pulse shaping filter.

4. The method of claim 1, further comprising separating the pulse values into corresponding phase and amplitude values in advance of substituting the predetermined amplitude information for the identified pulse values, such that the modified pulse values comprise phase values and amplitude values.

5. The method of claim 4, further comprising passing the amplitude values of the modified pulse values through a low-pass filter in advance of transmit signal generation to reduce any spectral spread arising from substituting the predetermined amplitude information.

6. The method of claim 4, further comprising passing the phase values of the modified pulse values through a low-pass filter in advance of transmit signal generation.

7. The method of claim 1, further comprising performing the step of obtaining modified pulse values on a selective basis in dependence on whether the data signal comprises a linearized Gaussian Minimum Shift Keying (GMSK) signal, in which case modified pulse values are obtained, or comprises a non-GMSK signal, in which case the modified pulse values are not obtained.

8. The method of claim 1, further comprising low-pass filtering the modified pulses in advance of transmit signal generation to reduce any spectral spreading arising from substitution of the predetermined amplitude information.

9. The method of claim 1, wherein identifying the pulse values that correspond to a constant-amplitude portion of the desired transmit pulse shape comprises monitoring amplitudes of the pulse values relative to a defined amplitude threshold.

10. The method of claim 1, wherein the desired transmit pulse shape comprises a rising amplitude beginning portion, a constant-amplitude middle portion, and a falling amplitude ending portion, and wherein identifying the pulse values that correspond to a constant-amplitude portion of the desired transmit pulse shape comprises comparing pulse value amplitudes to a defined amplitude threshold to detect a substitution starting point at which the pulse value amplitudes rise above the defined amplitude threshold, and to detect a subsequent substitution ending point at which the pulse value amplitudes fall back below the defined amplitude threshold.

11. The method of claim 10, wherein substituting predetermined amplitude information for actual amplitude information in the identified pulse values comprises replacing actual pulse amplitudes with a predetermined amplitude for the pulse values occurring between the substitution starting and ending points.

12. The method of claim 10, wherein comparing pulse value amplitudes to a defined amplitude threshold comprises comparing digital-valued amplitudes of the pulse values to a stored digital-valued desired amplitude.

13. The method of claim 10, further comprising setting the defined amplitude threshold to a desired amplitude value for transmit signal generation.

14. A transmit circuit for use in a communication transmitter, the transmit circuit comprising:
    a processing circuit configured to receive filtered pulse values from a pulse shaping filter configured to output the pulse values according to a desired transmit pulse shape;
    said processing circuit further configured to obtain modified pulse values having a reduction in undesired amplitude modulation for transmit signal generation based on identifying the pulse values that correspond to a constant-amplitude portion of the desired transmit pulse shape, and substituting predetermined amplitude information for actual amplitude information in the identified pulse values.

15. The transmit circuit of claim 14, wherein the pulse values represent a linearized Gaussian Minimum Shift Keying (GMSK) signal pulse, and wherein the processing circuit is configured to reduce amplitude modulation in a nominally constant-amplitude portion of the GMSK signal pulse.

16. The transmit circuit of claim 14, wherein the processing circuit is configured to receive the pulse values as digital values.

17. The transmit circuit of claim 14, wherein the processing circuit is configured to receive the pulse values as digital phase values and corresponding digital amplitude values.

18. The transmit circuit of claim 14, wherein the processing circuit is configured to output the modified pulse values as digital phase values and corresponding digital amplitude values, of use in polar modulation-based transmit signal generation.

19. The transmit circuit of claim 18, wherein the processing circuit includes low-pass filters to filter the digital phase and amplitude values to reduce any spectral spreading arising from substituting the predetermined amplitude information.

20. The transmit circuit of claim 14, wherein the transmit circuit is configured to obtain modified pulse values on a selective basis in dependence on whether a transmitter in which the transmit circuit is included in is operating in a Gaussian Minimum Shift Keying (GMSK) signal modulation mode, or operating in a non-GMSK signal modulation mode.

21. The transmit circuit of claim 14, wherein the processing circuit comprises a comparator circuit to identify the pulse values that correspond to a constant-amplitude portion of the desired transmit pulse shape, and a control circuit to substitute the predetermined amplitude information for the actual amplitude information in the identified pulse values.

22. The transmit circuit of claim 21, wherein the processing circuit is configured selectively to obtain the modified pulse values responsive to a transmitter mode, such that the transmitter circuit obtains the modified pulse values if the transmitter mode is a Guassian Minimum Shift Keying (GMSK) signal modulation mode, and passes through the pulse values without modification if the transmitter mode is a non-GMSK signal modulation mode.

23. The transmit circuit of claim 22, wherein the transmit circuit further comprises a selectively activated digital filter to filter amplitude values of the modified pulses.

24. The transmit circuit of claim 21, wherein the desired transmit pulse shape comprises a rising amplitude beginning portion, a constant-amplitude middle portion, and a falling amplitude ending portion, and wherein the comparator circuit is configured to recognize pulse amplitude values corresponding to the middle portion by detecting the pulse value amplitudes that are above a defined amplitude threshold, and signaling the control circuit responsive to that detection.

25. The transmit circuit of claim 24, wherein the control circuit substitutes a predetermined amplitude value for actual amplitudes of the pulse values responsive to the comparator circuit signaling.

26. A mobile station for use in a wireless communication network, the mobile station comprising:
a transceiver configured to transmit communication signals to the network and receive communication signals from the network;
said transceiver including a transmit circuit configured to reduce undesired amplitude modulation in transmitted signal pulses based on selectively substituting predetermined amplitude information for actual amplitude information in pulse values used to generate the transmitted signal pulses.

27. The mobile station of claim 26, wherein the mobile station is configured to operate in a Gaussian Minimum Shift Keying (GMSK) mode wherein it transmits GMSK signal pulses, and is configured to operate in a non-GMSK mode wherein it transmits non-GMSK signal pulses.

28. The mobile station of claim 27, wherein the transmit circuit is configured to substitute the predetermined amplitude information if the mobile station is operating in the GMSK mode, and not to substitute the predetermined amplitude information if the mobile station is operating in the non-GMSK mode.

29. The mobile station of claim 27, wherein, in the GMSK-mode of operation, the transmit circuit is configured to substitute predetermined amplitude values in place of actual amplitude values obtained via a transmit pulse shaping filter for those actual amplitude values corresponding to a constant-amplitude portion of the GMSK signal pulses.

30. The mobile station of claim 27, wherein the transmit circuit comprises part of a transmitter included in the mobile station, and wherein the transmitter comprises a polar modulation transmitter configured to:
pass a transmit data signal through a pulse shaping filter to obtain corresponding pulse values; and
separate the pulse values into phase and amplitude values.

31. The mobile station of claim 30, wherein the transmitter is configured to generate transmit signal pulses via polar modulation based on the phase and amplitude values if operating in the non-GMSK mode, and, if operating in the GMSK-mode, modifying the amplitude values via the selective substitution of the predetermined amplitude information.

32. A method of reducing undesired amplitude variations in transmit signal pulses comprising:
passing a data signal through a pulse shaping filter to obtain input pulse values that correspond to a desired transmit pulse shape; and
generating output pulse values for transmit signal generation based on selectively substituting predetermined amplitude information for actual amplitude information in one or more of the input pulse values.

33. The method of claim 32, wherein generating output pulse values for transmit signal generation based on selectively substituting predetermined amplitude information for actual amplitude information in one or more of the input pulse values comprises performing the selective substitution in a Gaussian Minimum Shift Keying (GMSK) transmit mode, and not performing the selective substitution in a non-GMSK transmit mode.

34. The method of claim 33, wherein generating the output pulse values in the non-GMSK mode comprises passing the input pulse values through as the output pulse values for transmit signal generation.

35. The method of claim 32, wherein passing a data signal through a pulse shaping filter to obtain input pulse values that correspond to a desired transmit pulse shape further comprises separating the input pulse values into input phase values and input amplitude values.

36. The method of claim 35, wherein selectively substituting predetermined amplitude information for actual amplitude information in one or more of the input pulse values comprises, in at least one mode of transmitter operation, identifying the input amplitude values corresponding to a constant-amplitude portion of the desired transmit pulse shape, generating output amplitude values based on substituting a predetermined amplitude value for those identified input amplitude values.

* * * * *

UNITED STATES PATENT AND TRADEMARK OFFICE
CERTIFICATE OF CORRECTION

PATENT NO. : 8,204,158 B2  
APPLICATION NO. : 10/844156  
DATED : June 19, 2012  
INVENTOR(S) : Bright Page 1 of 1

It is certified that error appears in the above-identified patent and that said Letters Patent is hereby corrected as shown below:

On the Title Page, item (73), under "Assignee", in Column 1, Line 2, delete "(CH)" and insert -- (SE) --, therefor.

In Fig. 3, Sheet 2 of 4, in Box "104", in Line 6, delete "TRANSIT" and insert -- TRANSMIT --, therefor.

In Column 9, Line 35, in Claim 22, delete "Guassian" and insert -- Gaussian --, therefor.

Signed and Sealed this  
Twenty-second Day of January, 2013

David J. Kappos  
*Director of the United States Patent and Trademark Office*